(12) United States Patent
Ramalingam et al.

(10) Patent No.: US 8,831,290 B2
(45) Date of Patent: Sep. 9, 2014

(54) METHOD AND SYSTEM FOR DETERMINING POSES OF VEHICLE-MOUNTED CAMERAS FOR IN-ROAD OBSTACLE DETECTION

(75) Inventors: Srikumar Ramalingam, Cambridge, MA (US); Yuichi Taguchi, Arlington, MA (US); Menglong Zhu, Philadelphia, PA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 127 days.

(21) Appl. No.: 13/563,925

(22) Filed: Aug. 1, 2012

(65) Prior Publication Data

US 2014/0037136 A1    Feb. 6, 2014

(51) Int. Cl.
*G06T 7/20*    (2006.01)

(52) U.S. Cl.
USPC .......................................... 382/107

(58) Field of Classification Search
None
See application file for complete search history.

(56) References Cited

PUBLICATIONS

Booij, Olaf, and Zoran Zivkovic. "The planar two point algorithm." (2009).*
Pollefeys, Marc, David Nistér, J-M. Frahm, Amir Akbarzadeh, Philippos Mordohai, Brian Clipp, Chris Engels et al. "Detailed real-time urban 3d reconstruction from video." International Journal of Computer Vision 78, No. 2-3 (2008): 143-167.*
Ess, A.; Leibe, B.; Schindler, K.; Van Gool, L., "A mobile vision system for robust multi-person tracking," Computer Vision and Pattern Recognition, 2008. CVPR 2008. IEEE Conference on , vol., No., pp. 1,8, Jun. 23-28, 2008.*
Goedeme, T.; Tuytelaars, T.; Van Gool, L.; Vanacker, G.; Nuttin, M., "Feature based omnidirectional sparse visual path following," Intelligent Robots and Systems, 2005. (IROS 2005). 2005 IEEE/RSJ International Conference on , vol., No., pp. 1806,1811, Aug. 2-6, 2005.*
Nister, David, Oleg Naroditsky, and James Bergen. "Visual odometry for ground vehicle applications." Journal of Field Robotics 23, No. 1 (2006): 3-20.*
Ortin, Diego, and J. M. M. Montiel. "Indoor robot motion based on monocular images." Robotica 19.3 (2001): 331-342.*
Scaramuzza, Davide. "1-point-ransac structure from motion for vehicle-mounted cameras by exploiting non-holonomic constraints." International journal of computer vision 95.1 (2011): 74-85.*
Scaramejzza, D., "1-Paint-RANSAC Structure from Motion for Vehicle-Mounted Cameras by Exploiting Non-holonomic Constraints", International Journal of Computer Vision, vol. 95, issue 1. 2011.

* cited by examiner

*Primary Examiner* — Chan Park
*Assistant Examiner* — Geoffrey E Summers
(74) *Attorney, Agent, or Firm* — Dirk Brinkman; Gene Vinokur

(57) ABSTRACT

Poses of a movable camera relative to an environment are obtained by determining point correspondences from a set of initial images and then applying 2-point motion estimation to the point correspondences to determine a set of initial poses of the camera. A point cloud is generated from the set of initial poses and the point correspondences. Then, for each next image, the point correspondences and corresponding poses are determined, while updating the point cloud.

8 Claims, 4 Drawing Sheets

METHOD AND SYSTEM FOR DETERMINING POSES OF VEHICLE-MOUNTED CAMERAS FOR IN-ROAD OBSTACLE DETECTION

FIELD OF THE INVENTION

This invention relates generally to using computer vision for motion estimation, and more particularly to using the motion estimation for pose determinations of vehicle-mounted cameras to detect obstacles near vehicles.

BACKGROUND OF THE INVENTION

Accurate motion estimation of an object, such as a vehicle or robot, from a video acquired of an environment, e.g., a road or garage, near the vehicle by a camera mounted on the vehicle is an important problem in vehicle and robot navigation. Most conventional methods either use a camera model (monocular or stereo), or a motion model (planar or non-planar). To determine a relative motion of the vehicle with respect to the environment from a sequence of images, a minimal number of feature correspondences in a hypothesize-and-test framework, such as random sample consensus (RANSAC), produces accurate results in the presence of outliers.

Dense depth estimation from video sequences using a vehicle-mounted camera can be extremely useful for safety applications, such as detecting people and obstacle near moving vehicles, particularly in constricted environments such as garages, loading docks, drive ways, parking lots, and generally roads, etc., when the vehicle is backing up.

Minimal Solutions

Nistér's well known five-point method with a RANSAC framework is the preferred method for motion estimation in the presence of outliers. In the case of relative motion between two cameras, there are six degrees, of freedom (DOF) in the motion parameters: three DOF for rotation and three DOF for translation. For conventional cameras with a single center of projection, only five parameters can be determined, i.e., the translation can only be determined up to a scale. Accordingly, a minimum of five feature correspondences is needed to determine the motion parameters.

The feature correspondences can be obtained using Harris corners, a Kanade-Lucas-Tomasi tracker (KLT), and a scale-invariant feature transform (SIFT), for example. Usually, minimal approaches lead to a finite number of solutions for the motion, and the correct motion is selected based on physical constraints, or additional point correspondences.

Minimal solutions are known for several calibration and 3D reconstruction problems: auto-calibration of radial distortion, perspective three point problem, the five point relative pose problem, the six point focal length problem, the six point generalized camera problem, the nine point problem for estimating para-catadioptric fundamental matrices, the nine point radial distortion problem, point-to-plane registration using six correspondences, pose estimation for stereo setups using either points or lines, and pose estimation for monocular setups using both points and lines.

Restricted Motion Models

The relative motion of the camera is usually constrained by the associated application. For example, a camera mounted on a vehicle does not generally have all 6 DOF. If the traveling surface is planar, the camera can only undergo three DOF (two DOF of translation and one DOF of rotation).

Scaramuzza et al. have shown that motion can be parameterized using only one parameter for a certain class of vehicles, bicycles, and robots. Thus a 1-point method can be used. The underlying idea is that there exists an instantaneous center of rotation (ICR), and the vehicle follows a circular course around the ICR.

When an inertial measurement unit (IMU) is available, two measurement angles can be obtained using a gravity vector. The remaining unknowns are three parameters (1 DOF of rotation and 2 DOF of translation), which can be solved by a three-point motion estimation method using a quartic equation. This motion estimation method can be useful for cameras in hand-held digital devices, such as cellular telephones.

Another method uses 2-point motion estimation method for planar motion sequences. This is applicable for indoor robot ego-motion estimation when the camera mounted on the robot moves on a plane. The number of degrees of freedom is three (1 DOF of rotation and 2 DOF of translation). However, the relative motion can be recovered only up to a scale. In the RANSAC framework, the number of iterations required is usually smaller when the number of points required to determine the motion decreases. Given the complexity of the equations, that method determines the solutions iteratively with a Newton-Raphson algorithm, which consumes time, and not amenable for real-time applications.

Simultaneous Localization and Mapping (SLAM)

SLAM uses a motion model to smooth the trajectory of the camera and constrain the search area for feature correspondences for 3D environment reconstruction. SLAM is a method for fusing inertial measurements with visual feature observations. The current camera pose, as well as the 3D positions of visual landmarks are jointly estimated. SLAM-based methods account for the correlations that exist between the pose of the camera and the 3D positions of the observed features. However, SLAM-based methods suffer high computational complexity because properly treating the correlations is computationally complex, and thus performing vision-based SLAM in environments with thousands of features is problematic for real-time applications.

SUMMARY OF THE INVENTION

Many movable objects, e.g., vehicles, bicycles, robots, and people, can be equipped with cameras. The embodiments of the invention provide a method for estimating the relative motion of the object from a sequence of images of an environment near the object acquired by a single camera mounted on the object. The motion estimation can then be used to detect obstacles in the environment that might interfere with a safe operation and movement of the vehicle. Because the camera is fixed to the object, the motion of the object can be determined from poses of the camera.

As generally defined herein, a pose includes a 3D location and 3D orientation. The translational location and angular orientation of each pose can have up to three degrees of freedom (DOF).

The performance of motion estimation methods under non-holonomic constraints and planarity is well known for robotics and computer vision. The prior art methods typically use a smallest number of point correspondences with respect to the motion model. It is known that such minimal methods are efficient and accommodate outliers when used in a hypothesize-and-test framework, such as RANSAC.

The embodiments of the invention solve planar 2-point motion estimation analytically using a single quadratic (second order polynomial) equation subject to coplanarity and orthonormality constraints. That is, the method is non-iterative, unlike prior art methods that use the Newton-Raphson iterative algorithm. Non-iterative methods are more efficient, do not suffer from local minima problems, and can be performed in real-time, which is essential for vehicle safety applications.

Although prior art 2-point motion estimation generates a visually accurate vehicle trajectory in 2D, the motion is not precise enough to perform dense 3D reconstruction due to the non-planarity of many traveling surfaces.

Therefore, the embodiments use a 2-point relative motion method for a set of initial images followed by 3-point 2D-to-3D camera pose estimation for each subsequent next image.

Using this hybrid approach, accurate motion estimates can be generated for a plane-sweeping procedure that produces dense depth-maps for obstacle detection applications.

DETAILED DESCRIPTION OF THE PREFERRED EMBODIMENTS

The embodiments of the invention provide a method for determining poses of a camera from a sequence of images in a video acquired of an environment 103 near a movable object by the camera mounted on the object. The object can be a car, truck, bicycle, taxiing plane, robot, person, etc. Because the camera is in a fixed relationship with respect of the object, the pose of the camera can be used to determine the pose of the object, the motion of the object, as well as potential obstacles near the object.

As generally defined herein, a pose includes a location and orientation of the camera: The translational location T and angular orientation R each can have up to three degrees of freedom.

Motion Estimation

Figure 1:
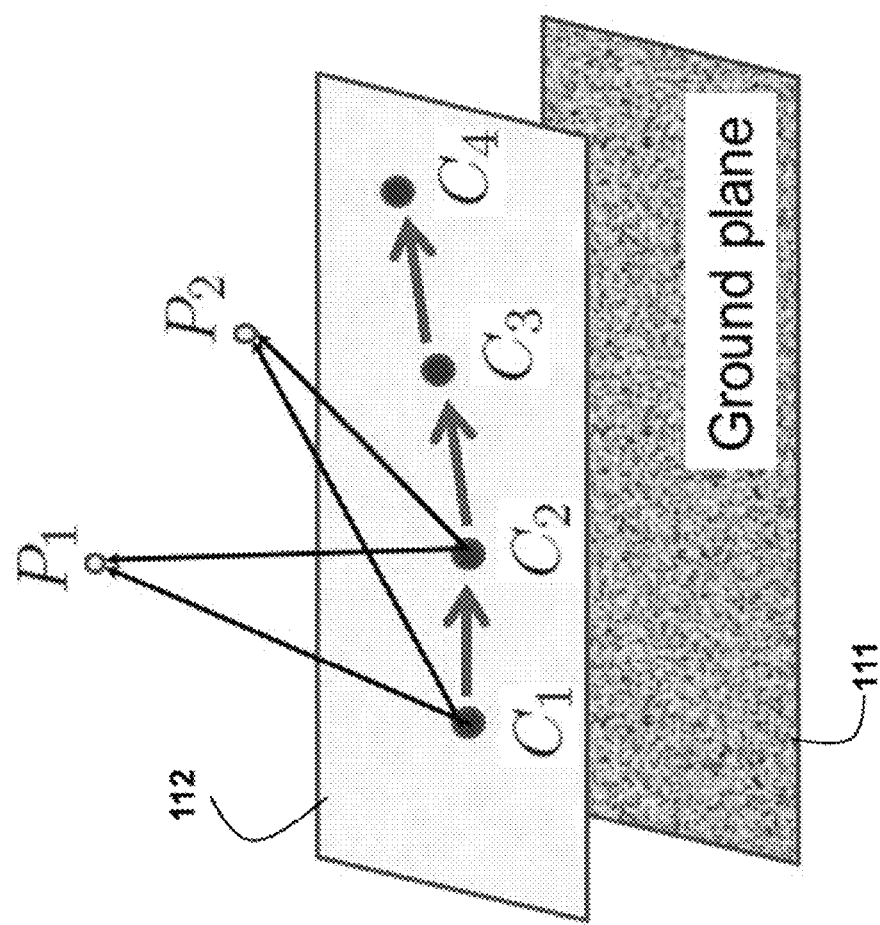
FIG. 1 is a schematic of a vehicle with a camera and motion estimated positions coplanar with a ground plane according to embodiments of the invention.
Figure 1:
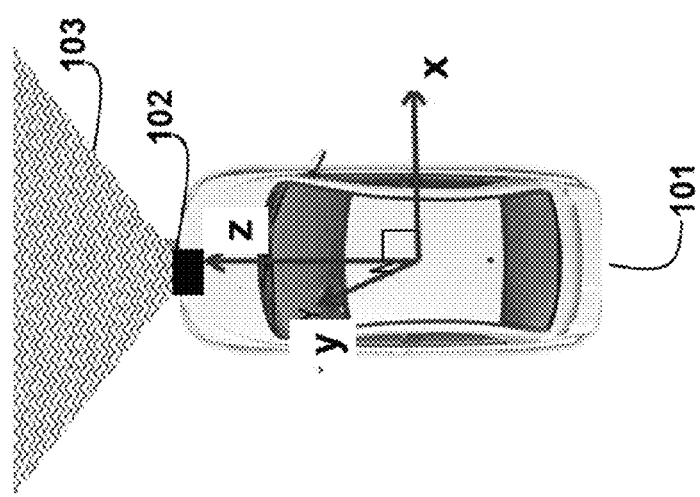

FIG. 1 shows two-point motion estimation for planar motion of a vehicle 101. The motion of the vehicle is substantially coplanar to a ground plane 111. The camera 102 moves on a plane 112 parallel to the ground plane along coordinate systems $C_1, C_2, C_3, C_4$. The figure shows the projection rays for two 3D points $P_1$ and $P_2$ from the camera at two coordinate systems $C_1$ and $C_2$, respectively.

Coordinate System Transformation

We use a camera coordinate system, a world coordinate system for the environment, and an intermediate coordinate system. During calibrations and initial use, the world coordinate system is transformed to an initial camera coordinate system. For example, in FIG. 1, the coordinate system $C_1$ corresponds to the world coordinate system after the transformation. Subsequent coordinate systems $C_2 \rightarrow C_3 \rightarrow G_4$ then reveal the motion of the camera.

Figure 2:
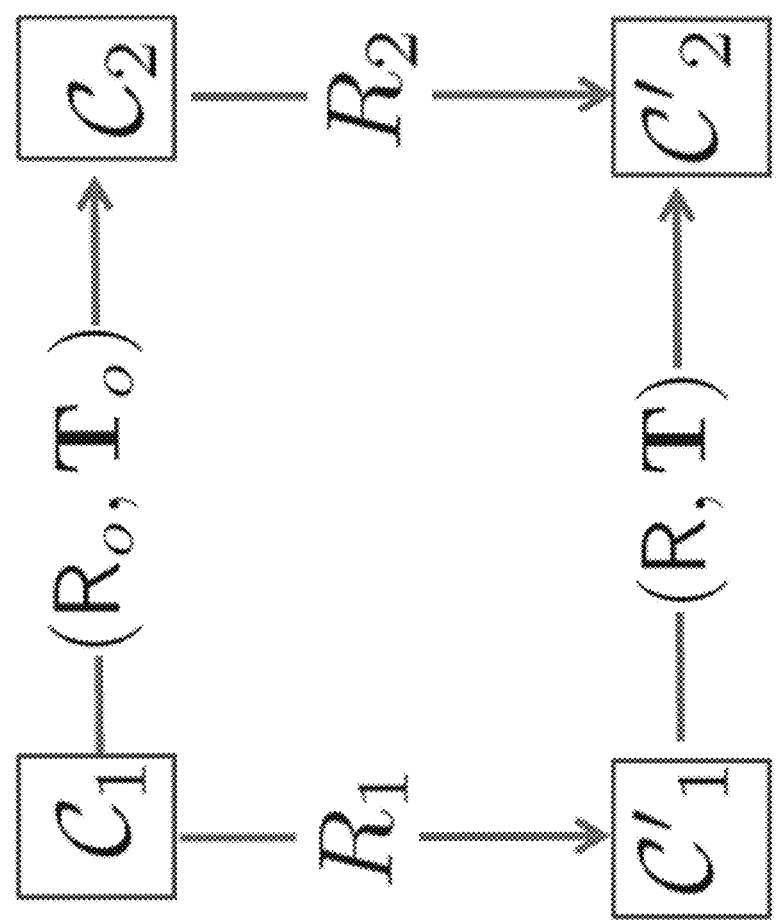
FIG. 2 is a schematic of a coordinate transformation for 2-point motion estimation according to embodiments of the invention.

FIG. 2 shows the general idea behind a coordinate transformation technique for the 2-point motion estimation method according to embodiments of the invention. Our goal is to determine the motion $(R_o, T_o)$, i.e., a pose between the camera coordinate systems $C_1$ and $C_2$. Note that $C_1$ is a transformation from the world coordinate system. We transform the coordinate systems $C_1$ and $C_2$ to two intermediate coordinate systems $C'_1$ and $C'_2$ respectively. We determine the motion $(R,T)$ between $C'_1$ and $C'_2$.

Method

Off-Line Preprocessing

Figure 3:
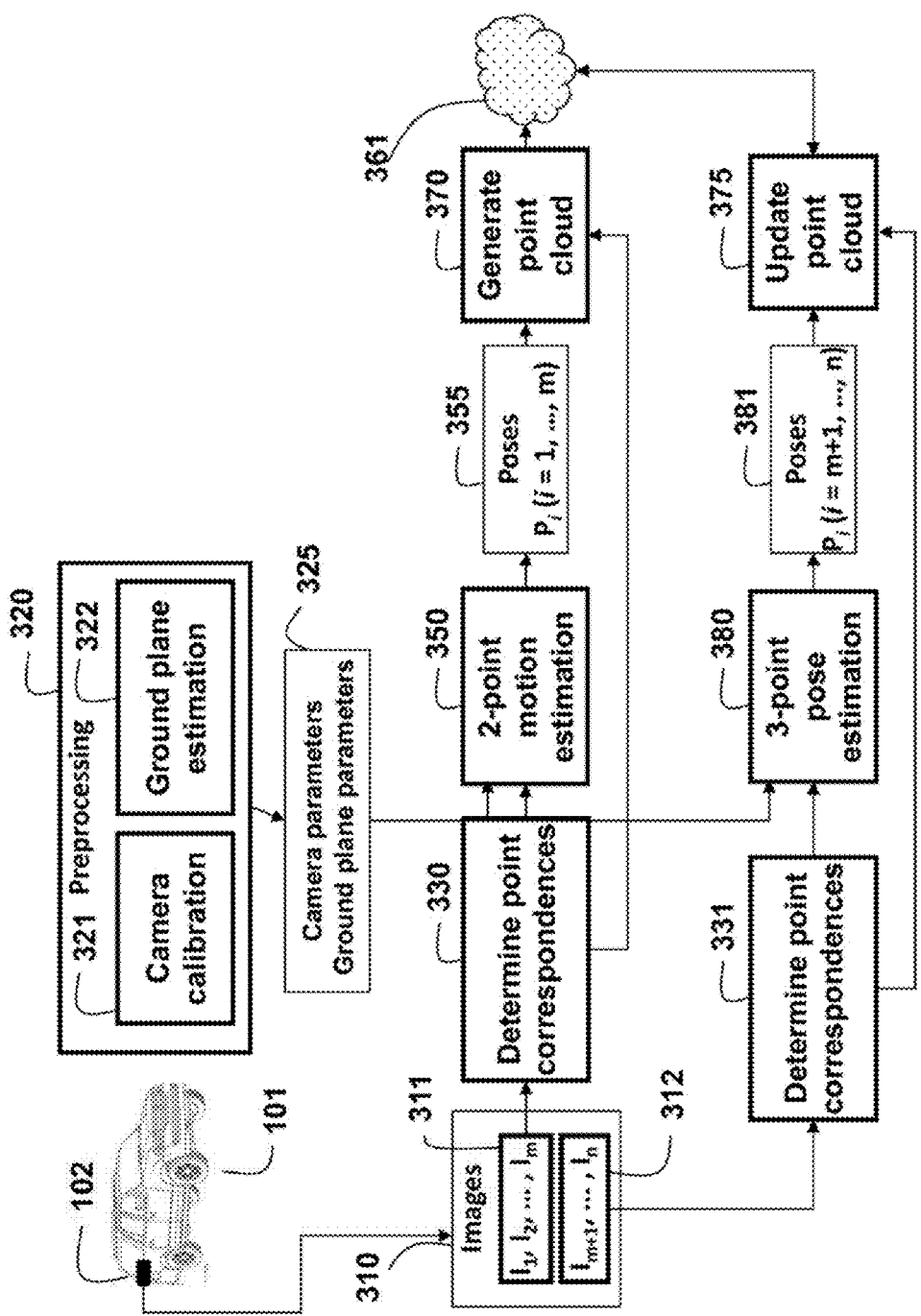
FIG. 3 is a flow diagram of a method for determining poses of a vehicle-mounted camera according to embodiments of the invention.

FIG. 3 shows the general method for pose determination according to embodiments of the invention.

Before operational deployment, the camera can be calibrated 321 and the ground plane can be estimated 322 as described below in detail. This can be performed during one-time, off-line preprocessing 320. The steps 321 and 322 produce camera parameters and ground plane parameters 325. This enables the transformation of the world coordinate system to the initial camera coordinate system.

Real-Time Processing

During operation, the camera 102 mounted on, for example, the vehicle 101 acquires a sequence of images 310 of the environment near the vehicle. For example, the vehicle is driving on a road, and it is desired to detect potential obstacles. Typically, the camera is generally directed at the ground plane. The sequence of images includes a set of initial images $I_i$ (i=1, ..., m) 311 and next images $I_i$ (i=m+1, ..., n) 312. The set of initial images includes, for example, 20 images (i.e., m=20).

Point correspondences are determined 330 from the set of initial images 331. Two-point motion estimation is applied 350 to the point correspondences to obtain a set of initial poses $p_i$ (i=1, ..., m) 355. The set of initial poses is used to generate 370 a point cloud 361. The point cloud is preferred to be "sparse." Here, sparseness is not an indefinite relative terms, but rather as conventionally known and defined in the art of numerical analysis.

Because the camera is in a fixed geometrical relationship with respect to the vehicle, the poses of the camera can be used to determine the motion of the vehicle, and more particularly to locate obstacles viewed in the video that can interfere with the vehicle's movement.

The above described 2-point motion estimation generates an on-road vehicle trajectory that is visually accurate. However, the motion is not precise enough to perforin dense 3D reconstruction due to the nonplanarity of roads. Therefore, we use the 2-point relative motion estimation 350 for the set of initial images 311, followed by a 3-point 2D-to-3D camera pose estimation 380 for the subsequent next images 312. That is, the point correspondences are determined 331 for each next image 312 with respect to the point cloud. The 3-point 2D-to-3D camera pose estimation 380 is applied to these point correspondences to determine the pose 381 of the next image, and the pose is used to update 375 the point cloud. The sequence of the poses of the initial images $p_i$ (i=1, ..., m) 355 and those of the next images $p_i$ (i=m+1, ..., n) 381 essentially reveal the motion experienced by the camera.

Using this hybrid approach, we generate accurate motion estimates for a plane-sweeping procedure 420 that produces accurate dense depth maps 430 for obstacle detection applications. The method is accurate enough to reconstruct small objects (10 cm wide poles, and boxes of dimensions 30 cm) at small distances (less than 2 meters). The plane sweeping procedure is described below with reference to FIG. 4.

Figure 4:
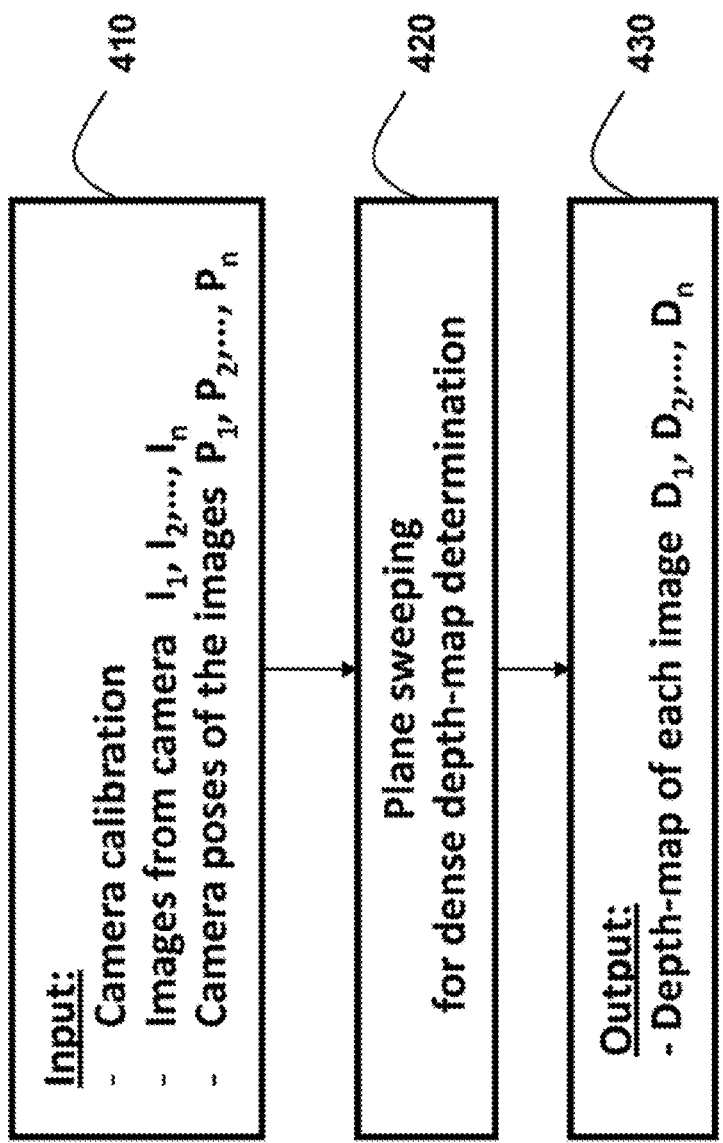
FIG. 4 is a flow diagram of a plane-sweeping procedure for determining dense depth-maps according to embodiments of the invention.

The steps shown in FIGS. 3-4 can be performed using a processor in the vehicle, for example, part of a vehicle navigation system. The method can operate in real-time. A graphic processing unit (GPU) can also be used.

2-Point Motion Estimation—Step 350

The motion estimation 350 obtains the relative poses for two images. Corresponding feature points p and p' in two images are related by an essential matrix E:

$$p'^T E p = 0. \quad (1)$$

Note that p and p' are expressed as unit vectors in spherical image coordinates, i.e., p and p' are pixels back-projected onto a unit sphere such that $\|p\|=\|p\|=1$. This is always possible when the camera is calibrated 321.

The essential matrix E can be determined using the relationship $E=[T]_x R$, where R is a 3×3 rotation matrix, and $[T]_x$ is the skew symmetric matrix of the 3×1 translation vector T:

$$[T]_x = \begin{pmatrix} 0 & -T_z & T_y \\ T_z & 0 & -T_x \\ -T_y & T_x & 0 \end{pmatrix}. \quad (2)$$

Planar Motion

As shown in FIG. 1, The camera 102 moves substantially in the plane 112. In the case when the camera is mounted on a vehicle, we assume that the ground plane 111 is parallel to the XZ plane and the camera moves on the XZ plane 112. Accordingly, a rotation matrix is $$R = \begin{pmatrix} \cos\theta & 0 & \sin\theta \\ 0 & 1 & 0 \\ -\sin\theta & 0 & \cos\theta \end{pmatrix}. \quad (3)$$

The rotation matrix represents a rotation around the Y axis by an angle θ. We rewrite the above rotation matrix by replacing cos θ and sin θ with α and β respectively:

$$R = \begin{pmatrix} \alpha & 0 & \beta \\ 0 & 1 & 0 \\ -\beta & 0 & \alpha \end{pmatrix}. \quad (4)$$

According to orthonormality constraint, we have $\alpha^2+\beta^2=1$.

Because the camera moves on the XZ plane, the Y coordinate of the translation vector is 0. The absolute scale cannot be determined. Hence, we assume that the translation vector is $$T = \begin{pmatrix} T_x \\ 0 \\ 1 \end{pmatrix}. \quad (5)$$

By fixing $T_Z=1$, we fix the scale of the motion. Due to the coordinate transformation we perform, this assumption is true even if the motion is along the X direction.

We use Equation (1) to determine the unknown parameters $(T_x, \alpha, \beta)$. Although there are three variables, the number of independent variables is two because $\alpha^2+\beta^2=1$. By directly solving equation 1 for two sets of points correspondences, we obtain two quadratic (second order polynomial) equations in three variables $(T_x, \alpha, \beta)$. Using the orthonormality constraint on α and β, we obtain eight solutions, or less.

Below, we describe that a coordinate transformation approach leads to a single quadratic equation, which can be solved for determining the motion.

Analytical Solution

As shown in FIG. 2, it is much simpler to determine the motion (R, T) between $C'_1$ and $C'_2$, than determining $(R_o, T_o)$ directly. That is, instead of directly determining the motion between these two coordinate coordinates, we pre-rotate both $C_1$ and $C_2$ in the camera coordinate system to intermediate reference coordinates $C_1^i$ and $C_2^i$ respectively.

We select these intermediate reference coordinates such that the motion estimation equations become as simple as possible. After we determine the motion between these coordinates (R, T) in the intermediate coordinate system, we can determine the motion in the camera coordinate system using a post-rotation.

Intermediate Coordinates

The two point correspondences are $(p_1, p'_1)$ and $(p_2, p'_2)$, respectively. As shown in FIG. 2, we rotate the first coordinates $C_1$ in the camera coordinate system by the rotation matrix $R_1$ such that the z coordinate of the first point $p_1$ becomes 0. Similarly, we rotate the second coordinates $C_2$ by a rotation matrix $R_2$ such that the z coordinate of the second point $p'_2$ becomes 0. The intermediate coordinates are $C'_1$ and $C'_2$. The new correspondences $(a_1, b_1)$ and $(a_2, b_2)$ are $$a_i = R_1 p_i, b_i = R_2 p'_i, i = \{1, 2\} \quad (6)$$

In the intermediate coordinate system, we have $$a_1 = \begin{pmatrix} a_{1x} \\ a_{1y} \\ 0 \end{pmatrix}, a_2 = \begin{pmatrix} a_{2x} \\ a_{2y} \\ a_{2z} \end{pmatrix}, \text{ and} \quad (7)$$

$$b_1 = \begin{pmatrix} b_{1x} \\ b_{1y} \\ b_{1z} \end{pmatrix}, b_2 = \begin{pmatrix} b_{2x} \\ b_{2y} \\ 0 \end{pmatrix}. \quad (8)$$

The rotation matrices $R_1$ and $R_2$ are equivalent to rotating the coordinate around the Y-axis such that the Z coordinate of the point becomes 0:

$$R_i = \begin{pmatrix} \cos\theta_i & 0 & \sin\theta_i \\ 0 & 1 & 0 \\ -\sin\theta_i & 0 & \cos\theta_i \end{pmatrix}. \quad (9)$$

Here $\theta_1 = \tan^{-1}(p_{1z}/p_{1x})$ and $\theta_2 = \tan^{-1}(p'_{2z}/p'_{2x})$ Solution Using Equations (4) and (5), we obtain the essential matrix $$E = [T]_x R \quad (10)$$

$$= \begin{pmatrix} 0 & -1 & 0 \\ 1 & 0 & -T_x \\ 0 & T_x & 0 \end{pmatrix} \begin{pmatrix} \alpha & 0 & \beta \\ 0 & 1 & 0 \\ -\beta & 0 & \alpha \end{pmatrix}$$

$$= \begin{pmatrix} 0 & -1 & 0 \\ \alpha + \beta T_x & 0 & \beta - \alpha T_x \\ 0 & T_x & 0 \end{pmatrix}.$$

After the coordinate transformation, Equation (1) becomes $b_i^T E a_i = 0$, for $i = \{1, 2\}$. When $i = 1$, we have $$\begin{pmatrix} b_{1x} \\ b_{1y} \\ b_{1z} \end{pmatrix}^T \begin{pmatrix} 0 & -1 & 0 \\ \alpha + \beta T_x & 0 & \beta - \alpha T_x \\ 0 & T_x & 0 \end{pmatrix} \begin{pmatrix} a_{1x} \\ a_{1y} \\ 0 \end{pmatrix} = 0, \quad (11)$$

resulting in $$g_1 \beta T_x + g_2 T_x + g_1 \alpha + g_3 = 0, \quad (12)$$

where $$g_1 = a_{1x} b_{1y}, \quad (13)$$

$$g_2 = a_{1y} b_{1z}, \quad (14)$$

and $$g_3 = -a_{1y} b_{1x}. \quad (15)$$

When $i = 2$, we have $$\begin{pmatrix} b_{2x} \\ b_{2y} \\ 0 \end{pmatrix}^T \begin{pmatrix} 0 & -1 & 0 \\ \alpha + \beta T_x & 0 & \beta - \alpha T_x \\ 0 & T_x & 0 \end{pmatrix} \begin{pmatrix} a_{2x} \\ a_{2y} \\ a_{2z} \end{pmatrix} = 0, \quad (16)$$

where $^T$ is a transform operator, resulting in $$f_1 \alpha T_x + f_2 \beta T_x + f_2 \alpha - f_1 \beta + f_3 = 0, \quad (17)$$

where $$f_1 = -a_{2z} b_{2y}, \quad (18)$$

$$f_2 = a_{2x} b_{2y}, \quad (19)$$

and $$f_3 = -a_{2y} b_{2x}. \quad (20)$$

Using Equations (12) and (17), we obtain the following relation for $T_x$:

$$T_x = \frac{-g_1 \alpha - g_3}{g_1 \beta + g_2} = \frac{-f_2 \alpha + f_1 \beta - f_3}{f_1 \alpha + f_2 \beta}, \text{ and} \quad (21)$$

$$(-g_1 \alpha - g_3)(f_1 \alpha + f_2 \beta) = (g_1 \beta + g_2)(-f_2 \alpha + f_1 \beta - f_3). \quad (22)$$

By simplifying the above equation, we obtain $$h_1 \alpha + h_2 \beta + h_3 = 0, \quad (23)$$

where $$h_1 = g_3 f_1 - f_2 g_2, \quad (24)$$

$$h_2 = f_1 g_2 - f_3 g_1 + f_2 g_3, \quad (25)$$

and $$h_3 = f_1 g_1 - f_3 g_2. \quad (26)$$

Using the orthonormality constraint $\alpha^2 + \beta^2 = 1$ to replace all $\beta$'s in Equation (23), we obtain the following quadratic equation:

$$(h_1^2 + h_2^2)\alpha^2 + (2 h_1 h_3)\alpha + (h_3^2 - h_2^2) = 0. \quad (27)$$

We have two solutions for $\alpha$ by solving the above quadratic equation. After we determine $\alpha$, we can obtain $\beta$ as $$\beta = \frac{-h_1 \alpha - h_3}{h_2}. \quad (28)$$

We can then determine $T_x$ using Equation (21). Note that there are two solutions for $(T_x, \alpha, \beta)$, and we can determine the correct solution using additional correspondences. Finally, we perform the following operations to obtain the motion between the original coordinate coordinates:

$$R_o = R'_1 R R_2, \quad (29)$$

and $$T_o = R'_1 T, \quad (30)$$

to obtain the set of initial poses $p_i$ 355.

Sensitivity Analysis of Planarity Assumption

We analyze the effect to the planarity assumption on the accuracy of our method. In accordance with our method, we assume that the camera moves substantially in the XZ plane. The only rotation the method can determine is around the Y axis. Any rotation around the X or Z axes cannot be determined. Because the translation can only be up to a scale, the error is with respect to the direction of the motion on the plane.

In many vehicle navigation applications and localization problems, the rotation error around the Y axis is more important. Therefore, we also analyze the error in rotation around the Y axis. This is much lower than the overall rotation error. We considered images of size 100×100 pixels with a focal length of 100. The environment size is a cube of dimension 100 units. We added Gaussian noise with standard deviation of 0.2 in the testing.

Omni-Directional Camera Calibration

We use a small omni-directional (fish-eye), monocular camera, which is easy to mount on vehicles. We tested several video sequences by mounting the camera on both the front and rear of the vehicle. The camera is calibrated 321 by acquiring images of a checkerboard. The calibration is used to rectify the video sequence acquired from the camera. The image resolution is 1920×1080 pixels. Using the calibration, we constructed rectified images of 1000×500 pixels.

After the camera is calibrated and the images are rectified, the methods described can be used with any omni-directional cameras, as well as any standard perspective cameras. The image rectification projects the pixels from the original image onto a common image plane from the projection center. During this process, distortions introduced by the camera model such as curved lines are also corrected to straight lines.

Ground Plane Estimation

Ground plane estimation 322, for the world coordinate system, can be performed during the preprocessing 320. It is assumed that the distance between the camera and the ground plane does not vary significantly during operation of the camera.

We place a white board with known dimensions (about a square meter) on the ground to determine the ground plane parameters in the camera coordinate system. In a video sequence, we track four boundary lines of the white board. The boundary lines are used to determine the boundary points. We use the three-point 2D-to-3D pose estimation method to determine the pose of the board with respect to the camera in video images. The pose of the board is determined using a RANSAC framework from the multiple images. After the ground plane is estimated, we use this to align the camera coordinate system such that its XZ plane is parallel to the ground plane. This alignment is used for the minimal 2-point motion estimation 350.

Feature Computation

We compared Harris corners, SIFT features, and KLT features to obtain our points. We observed that KLT produced more evenly distributed features compared to SIFT and Harris, thus we prefer to use the KLT features.

Motion and Pose Estimation

We determined that our planar motion assumption holds for a relative short distance. For a camera moving on a plane with one degree of rotation, the epipole should always be on the horizon. The epipole can be determined by the intersection of line segments joining the point correspondences from two images. We determined the epipoles for several image pairs, and found that the epipoles do not always lie on the horizon line.

Therefore, we determine the motion estimates for the set of initial images using the 2-point motion estimation method. The absolute scale is fixed using the estimated ground plane.

After the set of initial images, we used the three-point 2D-to-3D pose estimation to determine all six DOF motion parameters. This is related to large scale structure-from-motion problems.

The initial camera pose 355 given by our 2-point method are used to triangulate the point correspondences and generate the sparse point cloud, which includes the initial reconstruction. Using this sparse point cloud, we can determine the pose of each subsequent next image using the three-point camera pose estimation method. The initial sparse point cloud is updated as new 3D points become available in the subsequent images.

We observed that the five-point method is better for sideways motion rather than a forward motion. Because the camera observes most of the points on a mostly featureless ground plane, this scenario is particularly challenging for the five-point method.

Dense Depth-Map Reconstruction

As shown in FIG. 4, we adapt a plane sweeping procedure 420 to determine a dense depth-map 430 for each image in the video sequence. The input 410 to the plane sweeping procedure includes the camera calibration parameters 325, the images 310 from the camera, and the poses 355 and 381 of the images. Plane sweeping provides a simple and efficient way to reconstruct the depth-map 430 using as the input any number of images and their camera poses. The procedure is suitable for graphics processor unit (GPU) implementation, and can be used for dense 3D reconstruction from vehicle-mounted cameras.

In our implementation, we define a set of fronto-parallel planes with depths $d_i$ (i=1, ..., D) in the coordinate system of the current image. For each depth layer $d_i$, we project the current image and N−1 previous images using projective texture mapping on the GPU and determine a matching cost $C(x,d_i)$ for each pixel x.

As the matching cost, we determine the absolute intensity difference among all combinations of the N images for each pixel and take an average of the smallest 50% values, which allows the method to handle occlusions. Then, we smooth the cost in each depth layer with a small local window (11×11 pixels). We finally determine the optimal depth by determining a minimum cost for each pixel as $d(x)=\arg\min_i C(x,d_i)$.

Effect of the Invention

The embodiments of the invention provide a system and method for relative motion estimation and dense 3D reconstruction of nearby environments from a monocular video sequence acquired by a monocular camera mounted on a (moving) vehicle.

A non-iterative solution is provided for the planar 2-point relative motion estimation method. Using a plane-sweeping method along with the motion estimation, the method determines a sequence of dense depth-maps of the environment, in contrast to sparse point clouds that most conventional image-based methods provide. Furthermore, we use a simple non-iterative technique that can be implemented in an embedded processor of a vehicle navigation device or a GPU.

Depth-map reconstruction from video sequences from vehicle-mounted cameras is extremely useful for vehicle safety applications, such as obstacle detection.

In comparison with other sensors, such as an ultrasonic sensor, a laser scanner, a short range radar network, or stereo cameras, our single camera based solution is much cheaper.

A single camera is sufficient to obtain accurate (dense) depth-map for obstacle detection. We use accurate motion parameters of the camera to determine the depth-maps. Instead of using just two images for motion-based stereo analysis, we use a set of images, e.g. 20 to 30, to reconstruct the depth-map using a plane sweeping process. The plane-sweeping can also be implemented in the GPU and can be performed in real-time.

The method solves the planar 2-point motion estimation using a single quadratic equation subject to coplanarity and orthogonality constraints. The solution can be obtained by a coordinate transformation approach to simplify the equations.

Many prior art approaches use time-consuming iterative techniques such as Newton-Raphson's method. Our non-iterative method is more efficient, and does not suffer from local minima problems.

Although 2-point motion estimation generates a visually accurate vehicle-trajectory, the motion is not precise enough to perform dense 3D reconstruction due to the non-planarity of roads, garage floors, driveways, etc. Thus, we use a 2-point motion method for the set of initial images, and then use 3-point 2D-to-3D pose estimation for subsequent next images. Using this hybrid approach, we generate accurate motion estimates for a plane-sweeping method that produces dense depth-maps for obstacle detection applications.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for determining poses of a camera relative to an environment, wherein the camera is movable, comprising:
   determining point correspondences from a set of initial images acquired of the environment by the camera;
   applying 2-point motion estimation to the point correspondences to determine a set of initial poses of the camera; and
   generating a point cloud from the set of initial poses and the point correspondences, and for each next image, performing the steps of:
   determining the point correspondences from the next image;
   determining the pose of the camera from the point correspondences of the next image and the point cloud; and updating the point cloud according to the pose and the point correspondences of the next image, wherein the steps are performed in a processor, and wherein the 2-point motion estimation further comprises:

obtaining projection rays from the point correspondences;

transforming the projection rays in a first camera coordinate system to a first intermediate coordinate system, and a second camera coordinate system to a second intermediate coordinate system;

determining motion between the projection rays in the first and second intermediate coordinate systems using a quadratic equation subject to coplanarity and orthonormality constraints; and determining motion between the projection rays in the first and second camera coordinate systems using the motion computed in the first and second intermediate coordinate systems.

2. The method of claim 1, wherein the point cloud is sparse.

3. The method of claim 1, wherein the applying further comprises:

solving analytically a quadratic equation for the 2-point motion estimation.

4. The method of claim 1, further comprising:

applying a plane sweep procedure to the images with the poses to produce a dense depth map.

5. The method of claim 3, wherein the 2-point motion estimation is done in a random sample consensus (RANSAC) framework.

6. The method of claim 5, wherein hypotheses in the RANSAC framework are generated using at least two point correspondences.

7. The method of claim 1, wherein the camera is mounted on a vehicle.

8. The method of claim 4, further comprising:

detecting obstacles using the dense depth map.

* * * * *